(12) United States Patent
Sano et al.

(10) Patent No.: US 7,442,358 B2
(45) Date of Patent: Oct. 28, 2008

(54) FLAKY CARBONACEOUS PARTICLE AND PRODUCTION METHOD THEREOF

(75) Inventors: Hitomi Sano, Kanagawa-Ken (JP); Soichiro Kawakami, Kanagawa-Ken (JP); Tomoya Yamamoto, Fukui-Ken (JP); Katsuhiko Inoue, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 689 days.

(21) Appl. No.: 10/532,429

(22) PCT Filed: Apr. 2, 2004

(86) PCT No.: PCT/JP2004/004842

§ 371 (c)(1),
(2), (4) Date: Apr. 25, 2005

(87) PCT Pub. No.: WO2004/089820

PCT Pub. Date: Oct. 21, 2004

(65) Prior Publication Data

US 2006/0062713 A1    Mar. 23, 2006

(30) Foreign Application Priority Data

Apr. 4, 2003    (JP)    ............................. 2003-102030

(51) Int. Cl.
*B82B 1/00* (2006.01)
*B82B 3/00* (2006.01)
*C01B 31/00* (2006.01)
*C01B 31/02* (2006.01)
*C01B 31/04* (2006.01)
*D01F 9/12* (2006.01)
*D01F 9/127* (2006.01)

(52) U.S. Cl. ............... 423/448; 423/445 B; 423/445 R; 423/447.1; 423/447.2; 423/447.7; 977/734; 977/755; 977/758; 977/775; 977/832

(58) Field of Classification Search ............. 423/445 B, 423/445 R, 448, 447.1, 447.2, 447.7; 977/734, 977/755, 758, 775, 832, 735
See application file for complete search history.

(56) References Cited

U.S. PATENT DOCUMENTS 6,835,330 B2 * 12/2004 Nishino et al. .............. 252/503

(Continued)

FOREIGN PATENT DOCUMENTS

EP    1 300 363 A2    4/2003

(Continued)

OTHER PUBLICATIONS

Document edited by Karl M. Kadish et al., "Fullerenes", 2000, Wiley-Interscience New York 2000, XP002283205, (pp. 1-968).

(Continued)

*Primary Examiner*—Timothy C. Vanoy
*Assistant Examiner*—Serena L Hanor
(74) *Attorney, Agent, or Firm*—Fitzpatrick, Cella, Harper & Scinto (57) ABSTRACT

A carbonaceous particle is provided which comprises a hexagonal flake formed of an aggregate of a plurality of nanocarbons and having a side length of 0.1 to 100 mm and a thickness of 10 nm to 1 mm. Thereby, a carbonaceous particle is provided which has an excellent electron emission performance, has a high electron conductivity, shows excellent characteristics particularly when used for a secondary battery, and can suitably be applied to various devices other than a secondary battery as well.

19 Claims, 6 Drawing Sheets

U.S. PATENT DOCUMENTS

| | | | |
|---|---|---|---|
| 6,953,564 B2 | 10/2005 | Kawakami et al. | 423/447.3 |
| 7,001,581 B2 | 2/2006 | Kawakami et al. | 423/447.3 |
| 7,071,258 B1 * | 7/2006 | Jang et al. | 524/496 |
| 2005/0079119 A1 | 4/2005 | Kawakami et al. | 423/447.3 |
| 2006/0171873 A1 | 8/2006 | Inoue | 423/345 |

FOREIGN PATENT DOCUMENTS

| | | |
|---|---|---|
| EP | 1 300 364 A2 | 4/2003 |
| JP | 5-186865 | 7/1993 |
| JP | 6-32606 | 2/1994 |
| JP | 6-56414 | 3/1994 |
| JP | 6-157016 | 6/1994 |
| JP | 9-188509 | 7/1997 |
| JP | 10-273308 | 10/1998 |
| JP | 2000-86217 | 3/2000 |
| JP | 2000-95509 | 4/2000 |

OTHER PUBLICATIONS

M.S. Dresselhaus et al., "Science of Fullerenes and Carbon Nanotubes", 1996, Academic Press, San Diego, CA, XP002283206, (pp. 1-965).

* cited by examiner

|—————|
5nm

FLAKY CARBONACEOUS PARTICLE AND PRODUCTION METHOD THEREOF

TECHNICAL FIELD

The present invention relates to a carbonaceous particle having an excellent electron emission performance and a high electron conductivity, and a production method therefor.

BACKGROUND ART

Since fullerene (Buckminster fullerene $C_{60}$), a soccer ball shaped molecule consisting of 60 carbon atoms, was discovered by H. W. Kroto, R. E. Smallry, and R. F. Curl in 1985, and a carbon nanotube, a tube formed of a rolled graphene sheet (a hexagonal carbon network plane) was discovered by Iijima in 1991, methods of producing the so-called carbonaceous particles including fullerene and carbon nanotubes, have been developed, and applications of the carbonaceous particles to various fields are being investigated.

Methods proposed of producing a fullerene include: the oven laser-vaporization method for extracting a fullerene from soot obtained by irradiating graphite with a laser in an argon gas flow heated to a high temperature of about 1,200° C.; the resistive heating method for extracting a fullerene from soot obtained by ohmic-heating a graphite rod in a helium gas; the arc discharge method for extracting a fullerene from carbon soot obtained by generating an arc discharge between two graphite electrodes; the high frequency induction heating method for extracting a fullerene from soot obtained by heating and evaporating raw graphite by passing of a spiral current generated by high-frequency induction therethrough; the combustion method for extracting a fullerene from soot obtained by combusting a mixed gas of benzene and oxygen diluted with an argon gas, and the like. In addition, in Japanese Patent Application Laid-Open No. H5-186865, a method is disclosed which produces a carbon cluster by arc-discharging or resistive-heating of a pair of electrodes consisting of a carbon rod and a metal rod and arranged in a vessel filled with an inert gas. Moreover, in Japanese Patent Application Laid-Open Nos. H6-56414 and 6-32606, a production method is disclosed which separates a fullerene from a solid matter obtained by supplying an aromatic compound into a generated thermal plasma.

Because a carbon nanotube has an electron emission function, a hydrogen occlusion function, and further a function of effectively storing/releasing lithium through an electrochemical reaction, its applications to an FED (Field Emission display), a lithium secondary battery, or a hydrogen occlusion system are studied.

Methods proposed of producing a carbon nanotube include: the arc discharge method for conducting an arc discharge in a gas atmosphere containing a carbonaceous raw material such as a hydrocarbon; the laser vaporization method for forming a carbon nanotube by irradiating graphite as a target with a laser to vaporize it; the thermal decomposition method for thermally decomposing a gas of acetylene or the like as a carbonaceous raw material on a substrate on which a catalyst of cobalt metal or nickel metal is arranged.

In addition, in Japanese Patent Application Laid-Open No. H6-157016, a method is disclosed which generates an arc discharge between a pair of carbon rods by application of a DC current in a He gas atmosphere to deposit a carbon nanotube on a cathodic carbon rod. In Japanese Patent Application Laid-Open No. H9-188509, a method is disclosed which produces a carbon nanotube by generating an electrodeless high-frequency plasma and supplying a carbonaceous raw material and a metallic catalyst into the plasma. In Japanese Patent Application Laid-Open No. H10-273308, a method of producing a carbon nanotube by a laser vaporization method of irradiating a carbon rod with a laser, is disclosed. In Japanese Patent Application Laid-Open No. 2000-86217, a method of producing a carbon nanotube is disclosed which decomposes a hydrocarbon at a high temperature on a catalyst consisting of metallic molybdenum or a metallic-molybdenum-containing compound to deposit a carbon nanotube on the catalyst. In Japanese Patent Application Laid-Open No. 2000-95509, a method is disclosed which provides a tip of a rod-like anode containing carbon and a non-magnetic transition metal element and a tip of a rod-like cathode in opposition to each other, generating an arc discharge therebetween to generate a vapor of carbon and fine particles of the non-magnetic transition metal element, thereby depositing a carbon nanotube at a base end of the cathode.

However, the above-mentioned prior art methods of producing a carbonaceous particle such as a fullerene and a carbon nanotube, provide carbonaceous particles of a low purity, have problems in a production apparatus and a purification process, and consequently it is difficult for the methods to manufacture carbonaceous particles of a high purity in large quantities at a low cost.

DISCLOSURE OF THE INVENTION

It is an object of the present invention to provide a carbonaceous particle which has an excellent field electron emission performance, has a high electron conductivity, particularly shows excellent characteristics when used for secondary batteries, and can be suitably applied to various devices other than secondary batteries, as well.

It is another object of the invention to provide a method for inexpensively mass-producing the carbonaceous particles.

The present inventors extensively investigated for solving the above-mentioned problems in the prior art, and accomplishing the above objects through experiments. As a result, it has been found that when employing a compound containing carbon element (hereinafter, simply referred to "carbon-containing compound"), which is comparatively inexpensive and is easily available, as a raw material, and reacting the carbon-containing compound with at least iron or an iron compound as a catalyst, at least one of a compound containing oxygen element (hereinafter, simply referred to "oxygen-containing compound") and a compound containing sulfur element (hereinafter, simply referred to "sulfur-containing compound") as a cocatalyst, and at least one medium selected from the group consisting of carbon dioxide, an alcohol, an ether, a hydrocarbon, water and an inert gas, under the conditions of a pressure of 2.5 to 60 MPa and a temperature of 80 to 800° C., the carbonaceous particle can effectively be manufactured. As a result of evaluating the thus manufactured carbonaceous particle, it has been found that the carbonaceous particle has an excellent electron emission performance and a high electron conductivity, and shows excellent characteristics particularly when used for a secondary battery. As a result of observing the thus manufactured carbonaceous particle with a field emission scanning electron microscope (FESEM; S-4500 (trade name) produced by Hitachi, Ltd.; hereafter simply referred to as "SEM"), and a transmission electron microscope (TEM; JEO-200SX (trade name) produced by JEOL Ltd.; hereafter simply referred to as "TEM"), it has been found out that the carbonaceous particle is basically a hexagonal, flake-shaped (hereinafter, simply referred to "flaky") carbonaceous particle formed of an aggregate of a plurality of nanocarbons and having a length of a side (simply referred to "side length") of 0.1 to 100 μm and a thickness of 10 nm to 1 μm. The present invention has been accomplished based on these revealed facts.

According to a first aspect of the present invention, there is provided a hexagonal, flaky carbonaceous particle characterized by the above-mentioned particular appearance/shape and internal structure, and provides a production method therefor.

Namely, according to a first aspect of the present invention, there is provided a carbonaceous particle comprising a hexagonal flake formed of an aggregate of a plurality of nanocarbons and having a side length of 0.1 to 100 μm and a thickness of 10 nm to 1 μm.

In the present invention, it is preferred that the hexagonal flake has a layered structure and the ratio of the thickness to the side length of the hexagonal flake is 1/10 to 1/100.

Further, it is preferred that the hexagonal flake comprises a stack of a plurality of hexagonal sheets.

Moreover, it is preferred that the hexagonal flake comprises a microstructure comprising an aggregate of stacks of graphene sheets. Incidentally, the term "graphene" used herein is intended to mean graphite of a monoatomic layer, namely a two-dimensional 6-membered ring network structure consisting of carbon atoms.

Further, it is preferred that the graphene sheets are arranged such that the plane of the graphene sheet is substantially perpendicular to the plane of the hexagonal flake.

Moreover, it is preferred that the hexagonal flake comprises an aggregate of microcrystals simultaneously having crystal lattice planes with a crystal lattice spacing of 0.329 to 0.346 nm, 0.209 to 0.219 nm and 0.199 to 0.209 nm, respectively.

According to a second aspect of the present invention, there is provided a method of producing the above-mentioned carbonaceous particle, which comprises the step of reacting (a) a carbon-containing compound, at least (b) iron or an iron compound, (c) at least one of an oxygen-containing compound and a sulfur-containing compound, and (d) at least one medium selected from the group consisting of carbon dioxide, an alcohol, an ether, a hydrocarbon, water, and an inert gas, at a pressure within the range of 2.5 to 60 MPa and at a temperature within the range of 80 to 800° C.

In the present invention, it is preferred that the temperature and pressure during the reaction are such that at least one of the carbon-containing compound (a) and the medium (d) becomes a supercritical fluid or a subcritical fluid.

The method of producing the carbonaceous particle according to the present invention may further comprise the step of calcining a product obtained by the step for reacting (a), (b), (c), and (d), if needed.

It is preferred that the calcination is performed at a temperature within the range of 900 to 2,800° C. in an atmosphere of an inert gas such as nitrogen gas, argon gas, or the like.

The hexagonal, flaky carbonaceous particle having the particular appearance/shape and internal structure, which is provided by the present invention and is described above, can be said to be a novel carbonaceous particle, because it can objectively be distinguished and is different from conventional carbonaceous particles. The carbonaceous particle provided by the present invention is useful in industries, because of having an excellent electron emission performance and a high electron conductivity, due to having the above-mentioned fine structure, and shows excellent characteristics particularly when used for a secondary battery. In addition, the carbonaceous particle can inexpensively be provided to a market, because of employing a carbon-containing compound, which is comparatively inexpensive and easily available, as a raw material, and can be effectively manufactured by a comparatively easy production method as mentioned above.

BEST MODE FOR CARRYING OUT THE INVENTION

The method of producing a hexagonal, flaky carbonaceous particle according to the present invention will now be described in detail.

In a representative embodiment of the method of producing the carbonaceous particle according to the present invention, (a) a carbon-containing compound, and at least (b) iron or an iron compound which is considered to work as a catalyst, (c) at least one of an oxygen-containing compound and a sulfur-containing compound, and (d) at least one medium selected from the group consisting of carbon dioxide, an alcohol, an ether, a hydrocarbon, water and an inert gas, are put into a reaction vessel which can attain a high inner pressure, these raw materials introduced into the reaction vessel are heated to a predetermined temperature under application of a predetermined pressure to be reacted with each other for a predetermined time period, followed by cooling, thereby obtaining desired carbonaceous particles each having the particular appearance/shape and internal structure as described above. When a metallic element component existing in the resulting carbonaceous particle is unnecessary for a device made using the carbonaceous particle, the component is preferably removed by sublimation through calcination, or removed by subjecting the particle to a post-treatment such as cleaning in an acid or an alkali or other refining treatment. The pressure and temperature during the above reaction are preferably such that at least one of the carbon-containing compound and the medium becomes a supercritical fluid or a subcritical fluid.

Specifically, the pressure is preferably within the range of 2.5 MPa to 60 MPa, and the temperature is preferably within the range of 80° C. to 800° C. In the above production method, it is presumed that when the carbon-containing compound (a) comes into contact with the catalyst (b) and reacts therewith in the presence of the medium (d), by converting, for example, at least the carbon-containing compound (a) preferably into a supercritical fluid state, the carbon-containing compound (a) produces an active reaction intermediate, the reaction intermediate produced by means of the catalyst self-assembles and self-organizes to produce a desired carbonaceous particle having the particular appearance/shape and internal structure as described above. The "reaction intermediate" referred to above is considered to be an iron oxide or iron sulfide, and it is presumed that the carbonaceous particle is formed via the reaction intermediate.

Figure 1:
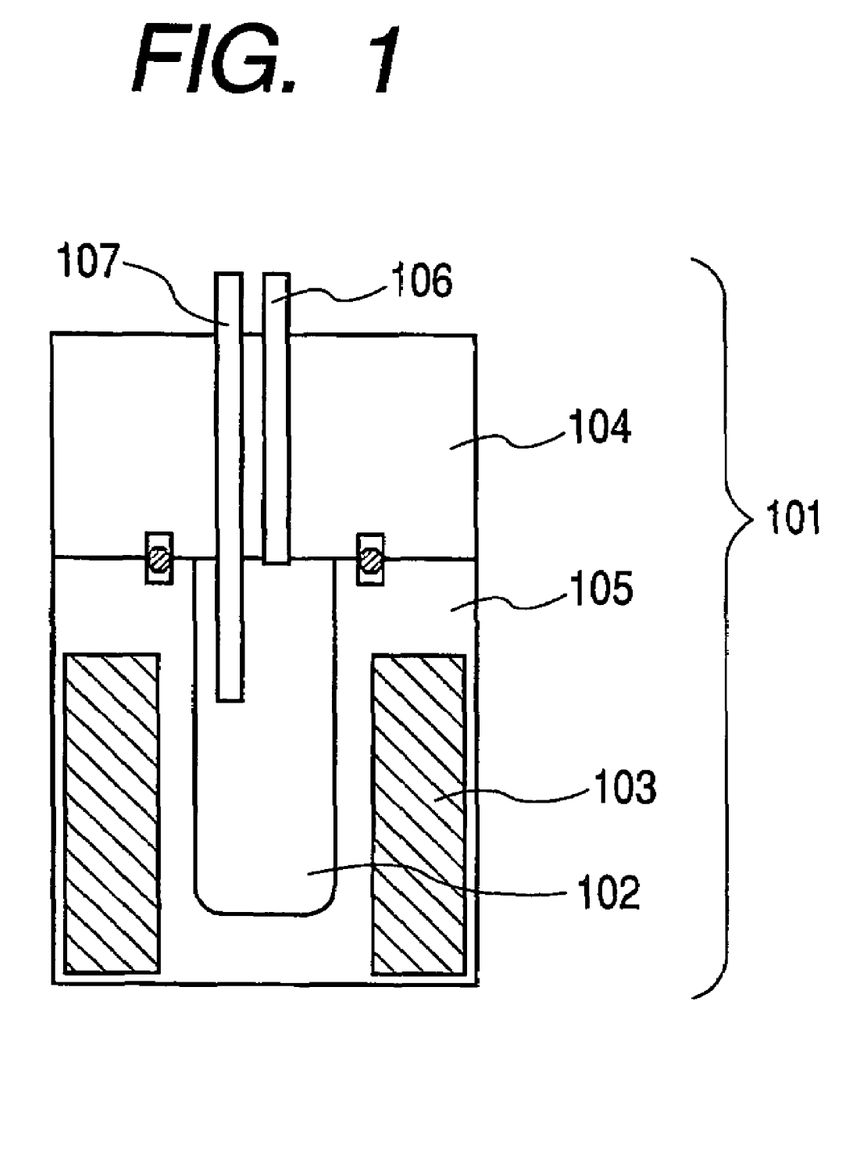
FIG. 1 is a schematic sectional view showing a configuration of one example of a production apparatus used for producing a carbonaceous particle according to the present invention.

FIG. 1 is a schematic view that shows a configuration of one example of a production apparatus suitable for carrying out the method of producing the hexagonal, flaky carbonaceous particle described above. In FIG. 1, reference numeral 101 denotes generally the production apparatus. In addition, referenced numeral 102 denotes a reaction vessel, 103 denotes a heater for heating the interior of the reaction vessel 102, 104 denotes an upper sealing member, 105 denotes a lower sealing member, 106 denotes a pressure controller for detecting and adjusting the pressure inside the reaction vessel 102, 107 denotes a temperature detecting means for detecting the temperature inside the reaction vessel 102 provided with a temperature sensor such as a thermocouple. The carbonaceous particle is produced with the use of the production apparatus 101 shown in FIG. 1, for example, in the following procedure. At first, raw materials ((a) a carbon-containing compound; at least (b) a transition metal mainly comprised of iron or a transition metal compound mainly comprised of iron; (c) at least one of an oxygen-containing compound and a sulfur-containing compound; and (d) at least one medium selected from the group consisting of carbon dioxide, an alcohol, an ether, a hydrocarbon, water and an inert gas) are introduced into the reaction vessel 102, and the reaction vessel 102 is tightly sealed with the upper sealing member 104. Subsequently, the inside of the reaction vessel 102 is heated to a predetermined temperature with the heater 103, and through the temperature detecting means 107 and the pressure controller 106, the temperature inside the reaction vessel 102 is kept at a predetermined temperature while the pressure inside the reaction vessel 102 is kept at a predetermined pressure. This condition is kept for a predetermined time period to react the raw materials in the reaction vessel 102. After the reaction has been completed, the reaction vessel 102 is cooled, the upper sealing member 104 is taken off, and a reaction product in the reaction vessel 102 (carbonaceous particles each having the particular appearance/shape and internal structure) is taken out. The reaction product, if necessary, may be subjected to a post-treatment such as calcination, cleaning with an acid or alkali, or refining. In calcination at a temperature of 900° C. to 2,800° C., the hexagonal, flaky carbonaceous particle obtained by the above production procedure has reduced an amorphous part thereof while keeping the shape of the hexagonal flake, and the crystallization of the graphene structure proceeds. The higher the calcination temperature, the higher the degree of crystallization. The degree of the crystallization can be analyzed with the electron beam diffraction method or X-ray diffraction method. In heat treatment at a temperature of 1,500° C. or more, the transition metal compound mainly composed of iron remaining as a catalyst sublimates to be removed. By this sublimation and removal, the hexagonal, flaky carbonaceous particle having pores in a shape of a warm-eaten spot (after the compound of a transition metal such as iron has fallen out) formed therein, is provided.

Each of the raw materials will hereinafter be described in detail.

[Carbon-Containing Compound (a)]

As the carbon-containing compound (a), known compounds may suitably be used including, for example, chain hydrocarbons (saturated or unsaturated chain hydrocarbons), cyclic hydrocarbons (alicyclic or aromatic hydrocarbons), alcohols, ketones, and the like.

Preferred examples of the saturated chain hydrocarbons include alkanes such as methane, ethane or propane.

Preferred examples of the unsaturated chain hydrocarbons include alkenes such as ethylene or acetylene and alkynes.

Preferred examples of the alicyclic hydrocarbons include cycloparaffins or cycloolefins.

Preferred examples of the aromatic hydrocarbons include fluoranthene, pyrene, chrysene, phenanthrene, anthracene, naphthalene, fluorene, indene, biphenyl, acenaphthene, toluene, xylene, and benzene.

Preferred examples of the alcohols include methanol, ethanol, butanol, or isopropyl alcohol.

Preferred examples of the ketones include acetone or methyl ethyl ketone.

The compound may be used singularly or as a mixture of two or more compounds. In addition, pitch, pitch coke, petroleum coke, coal tar, or the like can be employed as the carbon-containing compound (a). Incidentally, in the method of producing the carbonaceous particle, the carbon-containing compound (a) is preferably used in a supercritical state.

[Catalyst (b)]

The iron or iron compound, which is used for producing the carbonaceous particle of the present invention, is considered to work as a primary catalyst that decomposes a raw material of the carbonaceous particle, and bonds the reaction intermediates produced by the decomposition to each other to form the carbonaceous particle. Preferred examples of the iron compound include ferrocene, iron sulfide, iron acetylacetonate and iron carbonyl. In addition to the above iron or iron compound as the primary catalyst, a transition metal other than iron or a compound of a transition metal other than iron may be employed. These transition metals or transition metal compounds may be used as a mixture with a catalyst (b). By using the transition metal or transition metal compound in addition to the iron or iron compound, the reaction of producing the reaction product is promoted.

The term "transition metal" as herein employed is intended to embrace nickel, cobalt, copper, chromium, tungsten, molybdenum and titanium. The term "transition metal compound" as used herein is intended to encompass transition metal sulfides, transition metal carbides and organic transition metal compounds. Preferred examples of transition metal sulfides include nickel sulfide, cobalt sulfide, copper sulfide, titanium sulfide, tungsten sulfide and molybdenum sulfide. Preferred examples of transition metal carbides include tungsten carbide, molybdenum carbide and titanium carbide. Preferred examples of organic transition metal compounds include nickelocene, cobaltocene, nickel phthalocyanine, cobalt phthalocyanine, copper phthalocyanine, nickel formate, cobalt formate, nickel acetylacetonate, cobalt acetylacetonate, copper acetylacetonate, nickel carbonyl and cobalt carbonyl.

[Sulfur-Containing Compound (c)]

The sulfur-containing compound is considered to work as a cocatalyst that makes the raw material or the reaction intermediate self-assemble and self-organize and may be added at the same time with the iron or iron compound, which is a primary catalyst. It is possible that the sulfur-containing compound may be decomposed during a reaction of the present production method, and may form a part of the carbonaceous particle as a product. Further, sulfur element resulting from the decomposition of the sulfur-containing compound reacts with a transition metal element such as iron to form a transition metal sulfide. As the sulfur-containing compound, there may be included thiols, thiophenes, thioamides, and the like. As the thiols, those thiols that are represented by alkanethiols are preferably used. Preferred examples of the above-mentioned thiols include 1-octanethiol (n-octyl mercaptan), 1-decanethiol (n-decyl mercaptan), 1-dodecanthiol (n-dodecyl mercaptan), n-butyl mercaptan, propyl mercaptan, ethyl mercaptan, methyl mercaptan, benzyl mercaptan and thiophenol. Preferred examples of the above-mentioned thiophenes include thiophene, thiophene alcohols, thiophene aldehydes, thiophene acids, and thiophenecarboxylic acids. Further, preferred examples of the above-mentioned thioamides include thioformamide, thioacetamide and thiopropionamide.

The sulfur-containing compound is considered to coordinate with the catalyst (the primary catalyst) and the starting material (carbon-containing compound) through the sulfur atom of the cocatalyst, and to provide a self-arrangement action to a plurality of nanocarbons formed by the reaction of the raw material with the catalyst. More specifically, the sulfur-containing compound is considered to facilitate the arrangement and assembly of the plurality of nanocarbons produced, so that the plurality of nanocarbons may easily aggregate to form a carbonaceous particle having the particular appearance/shape and internal structure described above.

[Oxygen-Containing Compound (c)]

The oxygen-containing compound is considered to work as a cocatalyst that makes the raw material or the reaction intermediate self-assemble and self-organize and may be added at the same time with the iron or iron compound, which is a primary catalyst. It is possible that the oxygen-containing compound may be decomposed during a reaction of the present production method, and may form a part of the carbonaceous particle as a product. Further, oxygen element resulting from the decomposition of the oxygen-containing compound reacts with a transition metal element such as iron to form a transition metal oxide. As the oxygen-containing compound, there may be included, CuO, CdO, CoO, NiO, and the like.

[Medium (d)]

As the medium used for producing the carbonaceous particle, at least one medium (d) selected from the group consisting of carbon dioxide, an alcohol, an ether, a hydrocarbon, water and an inert gas is used as described above. Of the mediums (d) enumerated here, water and carbon oxide are more preferable.

The medium (d) is considered to exhibit a function of reducing a collision probability of molecules of the starting material (carbon-containing compound) to suppress side reactions, and a function of uniformly dispersing the raw material and the catalyst (b) to promote a reaction between the raw material and the catalyst, as is the case of a solvent. Further, it is presumed that carbon dioxide is also formed during synthesis of the carbonaceous particle through decomposition of the raw material and/or the at least one of the sulfur-containing compound and the oxygen-containing compound, or a reaction of those compounds with oxygen existing in the reaction vessel. When carbon dioxide is employed as the medium (d), the yield of the carbonaceous particle as a product is increased, probably because the equilibrium reaction shifts in such a direction as to suppress an increase in the concentration of carbon dioxide in the reaction system.

Preferred specific examples of the hydrocarbons as the medium (d) include ethane, propane and butane. Preferred specific examples of the alcohols include methanol and ethanol. The hydrocarbon and alcohol may become a part of a synthetic material of the carbonaceous particle according to the present invention.

Specific examples of the above-mentioned inert gas include helium gas, argon gas and nitrogen gas.

Hydrogen gas can be added in addition to the medium (d), as needed. Hydrogen gas has an effect of inhibiting growth of amorphous carbon.

[Reaction Temperature and Reaction Pressure]

In the method of producing the carbonaceous particle, it is preferable that the production reaction is carried out at such temperature and pressure that at least one of the carbon-containing compound (a) and the medium (d) is converted into a state of a supercritical fluid or a subcritical fluid. Although the reaction temperature and the reaction pressure somewhat depend on a production apparatus employed to some extent, the reaction temperature is preferably within the range of 80° C. to 800° C., more preferably within the range of 200° C. to 650° C., and most preferably within the range of 350° C. to 500° C. The reaction pressure is preferably within the range of 2.5 MPa to 60 MPa, more preferably within the range of 2.5 MPa to 50 MPa, and most preferably within the range of 3.1 MPa to 40 MPa.

The term "supercritical fluid" as herein employed is intended to mean a fluid that is in a state of a temperature and a pressure exceeding the critical temperature and pressure (critical point) at which liquid and gas can coexist and that has both properties of gas and properties of liquid. The term "subcritical fluid" as used herein is intended to mean a fluid similar to the supercritical fluid, and specifically mean a fluid that is at a temperature T (absolute temperature) and a pressure P (MPa) satisfying the following equations wherein $T_0$ (absolute temperature) and $P_0$ (MPa) are defined as a temperature (critical temperature) and a pressure (critical pressure) at the critical point and that is in such a state as to exceed the critical point.

$$T \geq 0.8 T_0$$

$$P \geq 0.8 P_0$$

[Post-Treatment]

As mentioned above, by reacting (a) a carbon-containing compound, (b) a catalyst, (c) a cocatalyst, and (d) a medium, in such temperature and pressure as to make at least one of the carbon-containing compound (a) and the medium (d) to be in a state of a supercritical fluid or a subcritical fluid, a desired carbonaceous particle having the particular appearance/shape and internal structure as described above is obtained. The resulting carbonaceous particle may be subjected to a post-treatment, as needed, such as calcination, cleaning, refining, or the like. The post-treatment is carried out for the purpose of removing a metal contained in the catalyst used in the production steps, removing impurities and byproducts, or increasing the purity of the carbonaceous particle as a reaction product. For instance, when a metal component is unnecessary for producing a device, it is removed by calcining the carbonaceous particle at a temperature of 500° C. to 2,800° C. in an inert gas. Calcination at a temperature of 500° C. to 1,000° C. is effective in removal of an unreacted raw material or removal of amorphous carbon. Calcination at a temperature of 900° C. to 2,800° C. can promote the development of the graphene structure. Calcination at a temperature of 1,500° C. to 2,800° C. can remove a transition metal compound derived from the transition metal element as employed for the catalyst. In this case, the calcination may be carried out in a multistage manner. For the above-mentioned inert gas, He, Ar, $N_2$ or the like is preferably used. In addition, metal components, impurities or byproducts may be removed with cleaning using an acid or alkali. In addition, by carrying out a refining treatment that is a combination of ultrasonic dispersion, centrifugal separation and calcination, the purity of the carbonaceous particle as the reaction product can be increased. Further, trace amounts of elements may remain depending on the conditions of the post-treatment. Such trace-amount elements include Fe, O, S, and the like.

[Appearance/Shape and Internal Structure of Carbonaceous Particle]

Figure 2A:
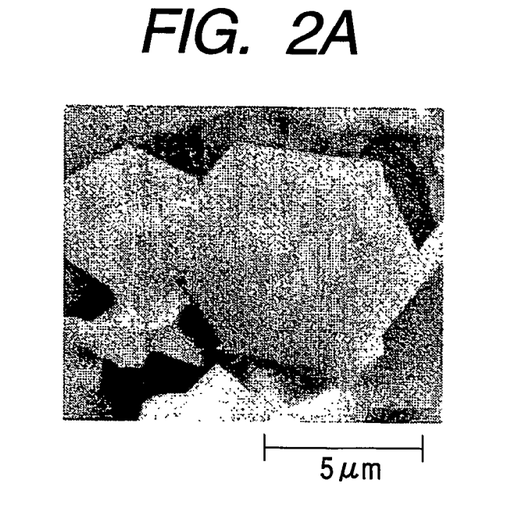
FIG. 2A is an SEM photograph of a carbonaceous particle produced according to the present invention.
Figure 2B:
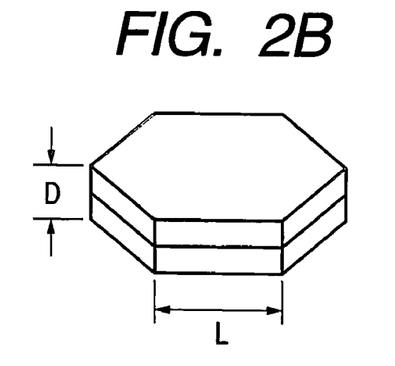
FIGS. 2B, 2C and 2D are perspective views schematically showing the appearance/shape of the carbonaceous particles produced according to the present invention.
Figure 2C:
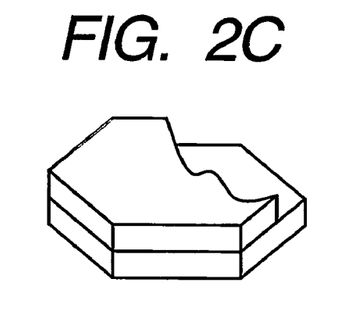

As a result of observation of the carbonaceous particle produced by the production method according to the present invention with a scanning electron microscope (SEM) (field emission scanning electron microscope (FESEM); S-4500 (trade name) produced by Hitachi, Ltd.), it has been found that the particle is mainly a hexagonal flaky carbonaceous particle having a geometrical symmetry as shown in FIG. 2A. Further, the above hexagonal shape is close to a regular hexagonal shape. Because a carbonaceous particle that misses a part of hexagonal sheets developed into a layered structure (schematically shown in FIG. 2C) has been found from an observation with the scanning electron microscope and a transmission electron microscope (TEM) (JEO-200SX (trade name) produced by JEOL Ltd.), the carbonaceous particle is considered to be formed of a stack of a plurality of hexagonal sheets as shown in FIG. 2B. Incidentally, L shown in FIG. 2B indicates the length of one side of the hexagon of the hexagonal, flaky carbonaceous particle, and D indicates the thickness of the carbonaceous particle (namely, the stack).

Figure 2D:
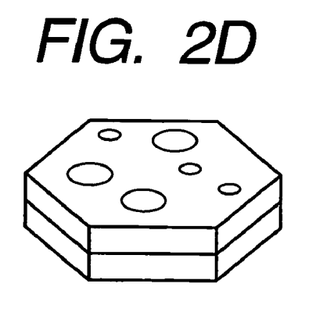

Further, when the carbonaceous particle obtained by the production method according to the present invention was calcined, and the calcination temperature was high, a hexagonal flake having holes was obtained with the hexagonal shape being kept, as shown in FIG. 2D. In this case, any transition metal element such as iron was not detected by an X-ray elemental analysis, and a development of the graphene structure was recognized judging from the development of a grid pattern observed with the transmission electron microscope.

Figure 3A:
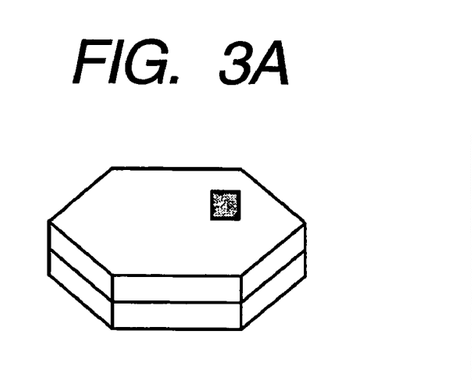
FIG. 3A is a perspective view schematically showing the appearance/shape of the carbonaceous particle produced according to the present invention.
Figure 3B:
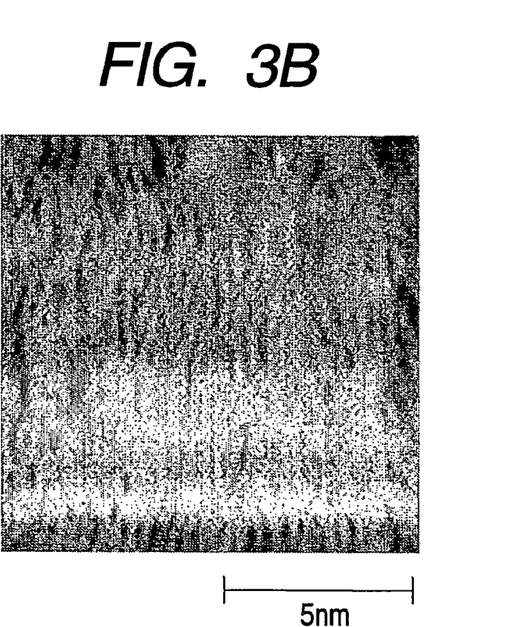
FIG. 3B is a TEM photograph of the carbonaceous particle.

FIG. 3B is a view showing a high-resolution image of the carbonaceous particle when observed with a transmission electron microscope in a direction perpendicular to the plane of the hexagonal sheet (indicated by □ in FIG. 3A). In FIG. 3B, a microstructure is observed, and it is considered that the microstructure is such that stacked graphene sheets are oriented perpendicularly to the hexagonal plane. The microstructure is a special structure different from a stacked structure of innumerable graphene sheets as is seen in natural graphite or the like, or a tubular structure like a rolled graphene sheet of a carbon nanotube.

Figure 3C:
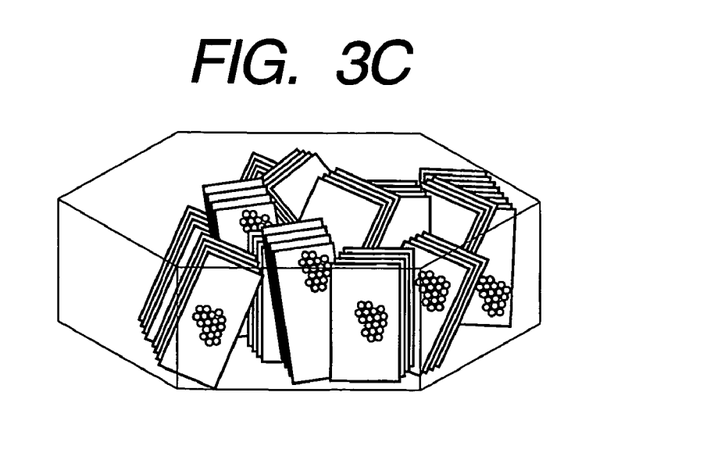
FIG. 3C is a perspective view schematically showing the internal structure of the carbonaceous particle.

Explaining the microstructure of the hexagonal, flaky carbonaceous particle according to the present invention with reference to the schematic view as shown in FIG. 3C, the particle is considered to be formed such that a plurality of layer planes forms a fine aggregate of graphene sheets (rectangular sheets in FIG. 3C), and a plurality of the aggregates gathers to self-grow into a well-balanced flaky hexagon.

[Analytical Method]

The appearance/shape and internal structure of the carbonaceous particle produced by the production method according to the present invention can be confirmed by an analytical method described below. Namely, the appearance and shape of the carbonaceous particle is observed with the above scanning electron microscope (SEM). The internal structure of the carbonaceous particle is observed with the above transmission electron microscope (TEM). Furthermore, the crystal state of the carbonaceous particle is analyzed by obtaining an electron diffraction pattern with the reflection high energy electron diffraction (RHEED). Namely, the lattice spacing can be determined from the obtained electron diffraction pattern using the following equation:

$$d = ml \cdot \lambda / r$$

wherein,
d: lattice spacing,
l: camera length,
r: radius in diffraction pattern,
λ: wavelength of electron beam,
m: photographic magnification,
ml: final camera length.

[Evaluation of Electron Emission Performance]

Figure 5:
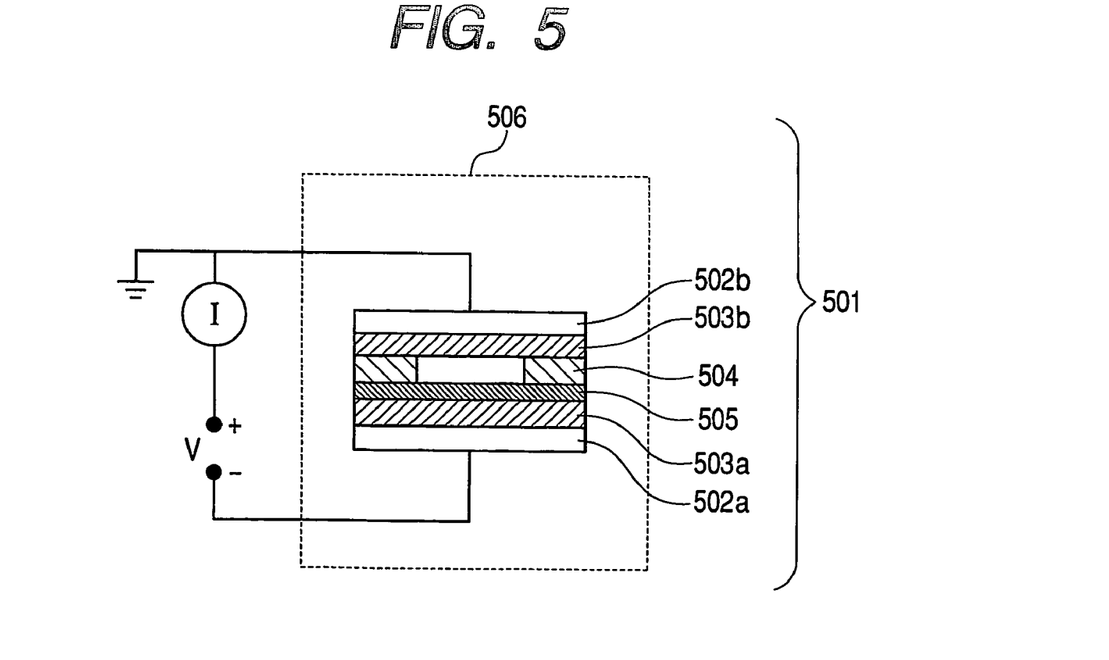
FIG. 5 is a schematic sectional view showing a configuration of one example of a field electron emission device.

The electron emission performance of the carbonaceous particle produced by the production method according to the present invention can be evaluated with the use of a field electron emission device (FED) shown in FIG. 5. In FIG. 5, reference numeral 501 denotes the whole field electron emission device. Further, reference numeral 502a, 502b denote a glass plate; 503a, 503b an electrode (anode and cathode); 505 a carbonaceous particle layer formed on the electrode 503a (layer formed using the produced carbonaceous particles); 504 a mica plate as a spacer; and 506 a vacuum vessel.

The formation of the carbonaceous particle layer 505 on the electrode 503a can be performed, for example, as follows. The electrode 503 and an opposing electrode (not shown) are put in a dispersion liquid having the carbonaceous particles produced by the production method according to the present invention dispersed in a solvent, and are connected to a voltage-applicable power source, then a predetermined voltage is applied for a predetermined time period to effect electrodeposition. As an alternative forming method, a paste prepared by adding a binder or the like to the carbonaceous particles may be applied to the electrode 503a to form the carbonaceous particle layer 505. Otherwise, the carbonaceous particles may be dispersed in an organic solvent and sprayed to adhere to the electrode 503a thus forming the carbonaceous particle layer 505.

A mica plate 504 is put on the substrate having the carbonaceous particle layer 505 formed on the electrode 503a as described above, then the other electrode 503b is put thereon as an opposing electrode, and they are sandwiched between a pair of glass plates 502 to make a cell. The cell is put in the vacuum vessel 506, an electric field is applied to the cell, and the field electron emission characteristics of the carbonaceous particle layer 505 are measured.

[Lithium Secondary Battery]

Figure 7:
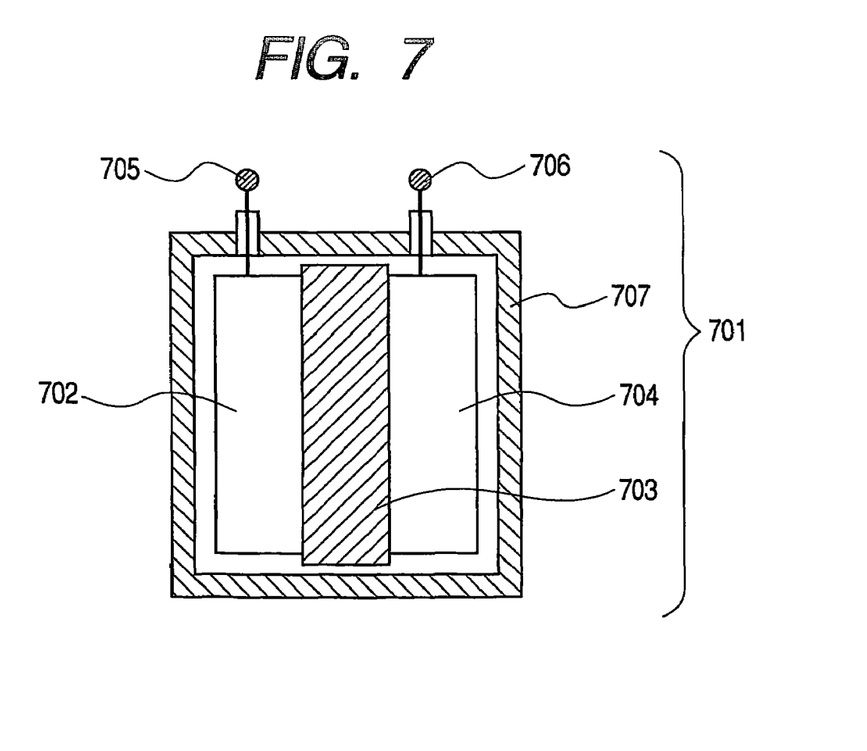
FIG. 7 is a conceptional sectional view showing a configuration of one example of a lithium secondary battery.
Figure 8:
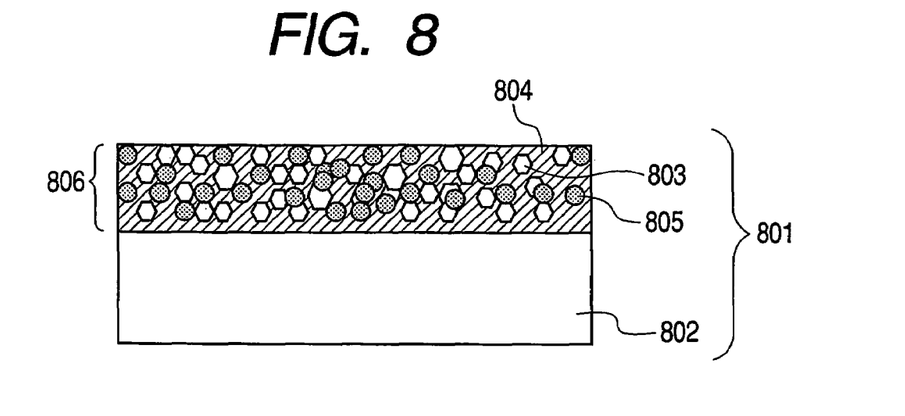
FIG. 8 is a schematic sectional view showing a configuration of an example of an electrode structure used as a negative electrode of a lithium secondary battery.

When the carbonaceous particles produced by the production method according to the present invention are used for a lithium secondary battery (including a so-called lithium ion secondary battery), the carbonaceous particles are preferably used for a negative electrode material. FIG. 7 is a conceptual view of a configuration of a lithium secondary battery. In FIG. 7, reference numeral 701 denotes the whole lithium secondary battery, 702 a negative electrode, reference numeral 703 an ionic conductor, reference numeral 704 a positive electrode, reference numeral 705 a negative terminal, reference numeral 706 a positive terminal, and reference numeral 707 denotes a battery housing (a battery case). The negative electrode 702 in FIG. 7 is formed of an electrode structure 801 shown in FIG. 8. In FIG. 8, reference numeral 802 denotes a current collector, reference numeral 803 the carbonaceous particle (the flaky, carbonaceous particle produced by the production method according to the present invention), reference numeral 804 a binder, reference numeral 805 a conductive auxiliary material, and reference numeral 806 an active material layer.

The electrode structure 801 can be manufactured by mixing the carbonaceous particles 803 with the binder 804 of an organic polymer, adding and mixing the conductive auxiliary material 805 and a solvent thereto, as needed, and using the resulting mixture to form the negative electrode active material layer 806 on the current collector 802 made of a copper foil. The electrode structure 801 is used as a negative electrode 702 of the lithium secondary battery shown in FIG. 7. As the positive electrode 704 is used an electrode structure produced, for instance, by appropriately adding and mixing a conductive auxiliary material such as graphite powder, a binder made of an organic polymer, and a solvent, to a powder of a lithium-transition metal oxide, a lithium-transition metal phosphate, or a lithium-transition metal sulfide, and using the resulting mixture to form the positive electrode active material layer on the current collector made of an aluminum foil. Incidentally, there are used as the binder a fluororesin such as polyvinylidene fluoride, a water-soluble polymer such as polyvinyl alcohol and the like. Further, the transition metal element of the lithium-transition metal oxide, the lithium-transition metal phosphate, and the lithium-transition metal sulfide used for the material of the positive electrode is preferably a transition metal element selected from the group consisting of cobalt, nickel, manganese and iron.

Between the negative electrode 702 and the positive electrode 704, a microporous polyolefin film retaining an electrolyte of a lithium salt that works as the ionic conductor 703, is placed as a separator. Thereby, the lithium secondary battery is obtained. As the electrolyte, there is used an electrolyte solution in which a lithium salt consisting of lithium ion ($Li^+$) and a Lewis acid ion ($BF_4^-$, $PF_6^-$, $AsF_6^-$, $ClO_4^-$, $CF_3SO_3^-$, $N(CF_3SO_2)_2^-$ or $BPh_4^-$ (Ph: phenyl group)) is dissolved in an organic solvent such as ethylene carbonate, propylene carbonate, dimethyl carbonate or diethyl carbonate. Incidentally, a gel prepared by adding a polymer to the electrolyte solution may also be used as the ionic conductor 703. As the microporous polyolefin film, a polyethylene film or a polypropylene film is used.

[Evaluation of Hydrogen Storage Performance]

Figure 9:
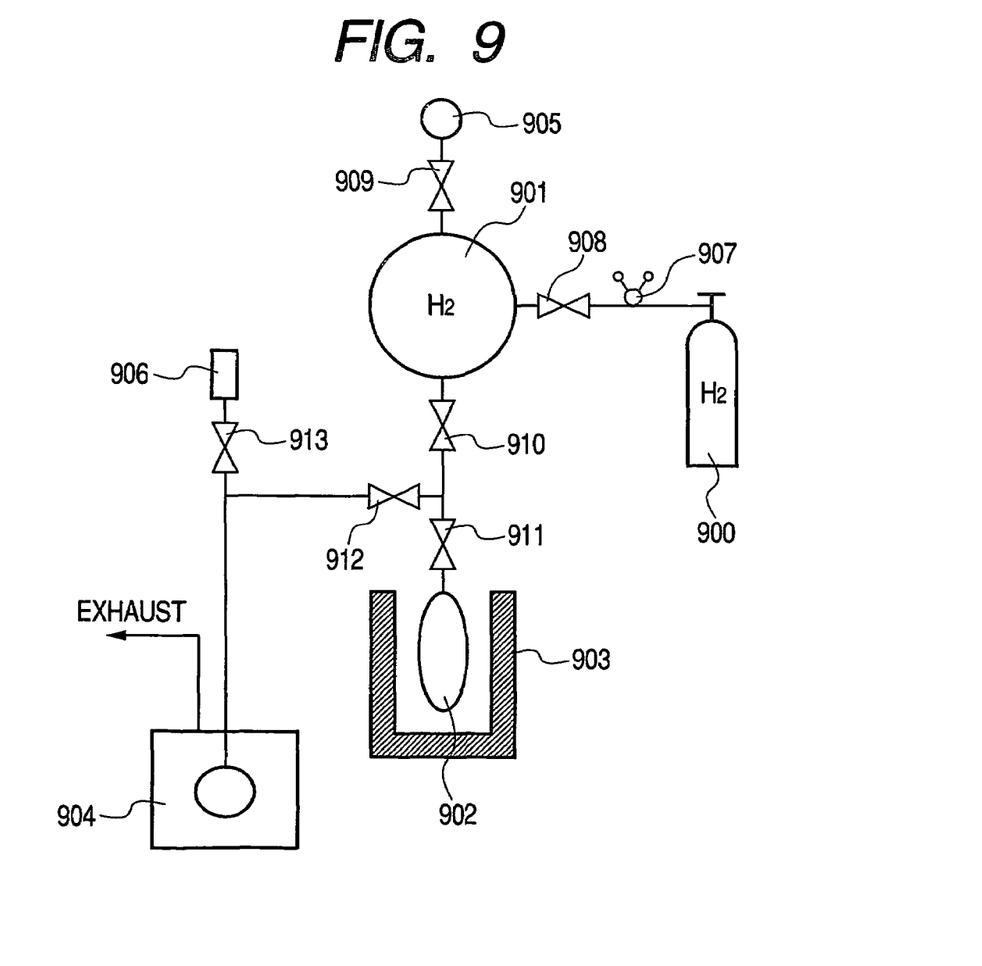
FIG. 9 is a schematic view showing a configuration of one example of a hydrogen storage performance evaluation apparatus.

The evaluation of the hydrogen storage performance of the carbonaceous particle produced by the production method according to the present invention when used for a lithium secondary battery as described above can be performed with the use of a measuring apparatus shown in FIG. 9, by making the carbonaceous particles occlude hydrogen gas at a low temperature, measuring the amount of hydrogen released by raising the temperature, and determining an amount of occluded hydrogen per unit weight. In FIG. 9, reference numeral 900 denotes a high pressure hydrogen cylinder, reference numeral 901 a hydrogen storage container with a known capacity, reference numeral 902 a charge container with a known capacity for charging the carbonaceous particles, reference numeral 903 a temperature controller, reference numeral 904 a vacuum pump, reference numeral 905 a pressure gauge, reference numeral 906 a vacuum gauge, and reference numeral 907 a pressure control valve. Reference numerals 908, 909, 910, 911, 912 and 913 designate opening/closing valves. To the charge container 902, the vacuum gauge 906 is connected through the opening/closing valves 911, 912, and 913, and the vacuum pump 904 is connected through the opening/closing valves 911 and 912. To the hydrogen storage container 901 to which the pressure gauge 905 is connected through the opening/closing valve 909, the hydrogen cylinder 900 is connected though the opening/closing valve 908 and the pressure control valve 907. Measurement using the measuring device shown in FIG. 9 configured as described above is carried out by, first, measuring the weight of the carbonaceous particles as sufficiently dried, charging the particles into the charge container 902, evacuating the container to a high vacuum degree with the vacuum pump 904, then opening the opening/closing valves 910 and 911 to introduce hydrogen to the charge container 902 from the hydrogen storage container 901 having a predetermined inner pressure, and measuring the hydrogen pressure inside the two connected containers (901 and 902) after elapse of a predetermined time period. Then, the amount of occluded hydrogen per unit weight of the carbonaceous particles can be calculated from an initial hydrogen pressure of the hydrogen storage container 901 and the capacities of the two containers. In practice, while varying the pressure of hydrogen introduced into the charge container 902 filled with the carbonaceous particles, the amounts of occlusion and release at an equilibrated pressure is measured, and the hydrogen storage capacity per unit weight is calculated.

EXAMPLES

The present invention will now be described in detail with reference to the following examples, but these examples are exemplary and the present invention is not limited to these examples.

Example 1

In the present example, carbonaceous particles (Sample No. S-01) were produced under the production conditions shown in Table 1 with the use of the production apparatus shown in FIG. 1 and raw materials shown in the table.

Figure 4:
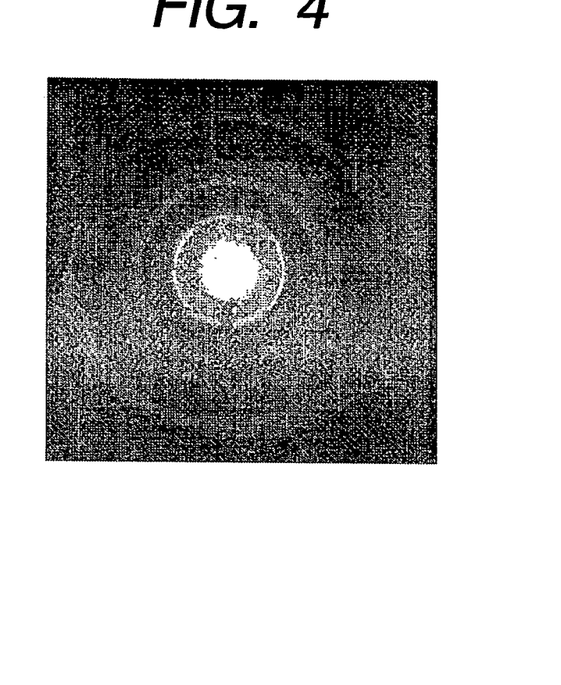
FIG. 4 is a view showing an electron beam diffraction pattern of a carbonaceous particle produced according to the present invention.

The production procedure includes firstly introducing the raw materials shown in Table 1 into the reaction vessel 102 of the production apparatus shown in FIG. 1, sealing the reactor with the upper sealing member 104, then heating the inside of the reaction vessel 102 to 450° C. with a heater 103, and keeping the inside of the reaction vessel 102 at this temperature through a temperature-detecting means 107 while keeping the pressure inside the reaction vessel 102 at a predetermined pressure with the pressure controller 106. While keeping this condition, the raw materials in the reaction vessel 102 were reacted with each other for 12. At that time, the ultimate pressure in the reaction vessel was 28 MPa. After completing the reaction, the reaction vessel 102 was cooled, the upper sealing member 104 was removed, and a reaction product in the reaction vessel 102 (carbonaceous particles each having the particular appearance/shape and internal structure) was taken out. A SEM photograph of the obtained reaction product is shown in FIG. 2A. Further, a TEM photograph of the reaction product is shown in FIG. 3B. It has been seen from the SEM photograph of FIG. 2A and the TEM photograph of FIG. 3B that the reaction product is a hexagonal, flaky carbonaceous particle formed of an aggregate of a plurality of nanocarbons and having a side length of 0.3 to 2.9 μm and a thickness of 0.08 to 0.1 μm. Further, the TEM observation revealed an image showing that the hexagonal, flaky carbonaceous particle has a multilayered structure in which a plurality of hexagonal sheets are stacked. Moreover, a result of a qualitative analysis for the carbonaceous particle with an elemental analyzer (EMAX5770 (trade name) produced by Horiba, Ltd.) revealed that the major component element of the produced carbonaceous particle is carbon element. FIG. 4 shows an electron beam diffraction pattern of the carbonaceous particle obtained with the reflection high energy electron diffraction (RHEED). It has been seen from the reflection electron beam diffraction pattern and the aforementioned equation that the carbonaceous particle is an aggregate of microcrystals simultaneously having planes with lattice spacings of 0.337 nm, 0.214 nm and 0.204 nm. The thus obtained lattice spacings are similar to those of graphite.

Further, the carbonaceous particle obtained above was heat-treated in an Ar atmosphere at 1,500° C., and the elements contained in the heat-treated carbonaceous particle were analyzed, with the result that the amounts of Fe, Ni, Co and S used as a catalyst were reduced to less than detection limit. This also showed that the major component of the carbonaceous particle was carbon. Judging from the observation result based on the TEM photograph and the electron beam diffraction pattern, the carbonaceous particle obtained in the present example is considered to be formed through a process in which microcrystals comprised of graphene similar to graphite aggregate, and self-grow into a hexagonal flake having a good geometrical symmetry.

TABLE 1

| Sample No. | Material/ Weight | Medium/ Weight | Solvent/ Weight | Production Conditions |
|---|---|---|---|---|
| S-01 | Pitch/ 2.5 g Ferrocene/ 0.25 g Nickelocene/ 0.25 g Cobaltocene/ 0.25 g Dodecanthiol/ 0.75 g | Carbon Dioxide/ 40 g | Toluene/ 2.5 g | Temperature 450° C. Pressure 28 MPa Time 12 hours |

Example 2

The field electron emission characteristics of the carbonaceous particle obtained in Example 1 were evaluated by using the field electron emission device shown in FIG. 5. At first, the carbonaceous particle of 0.22 g, which was obtained in Example 1 and ground with a planetary ball mill, was added to 75 ml of isopropyl alcohol, and was subjected to ultrasonic waves for six hours to obtain a homogeneous dispersion liquid. Then, electrodeposition was performed by application of a DC voltage of 100 V for five minutes, while being stirred with a magnet stirrer. Both anode and cathode used in the electrodeposition were stainless steel substrates. The electrodeposited substrate (electrode; 503a/505) was mounted on the glass substrate 502a of the measuring device 501 in FIG. 5; then the mica plate 504, the opposing electrode (stainless steel) 503b and the glass plate 502b were stacked in the named order to make a measurement cell, which was put in the measuring device 501; and a voltage was applied between the electrodeposited substrate 503a as a cathode and the opposing electrode 503b as an anode up to 300 V to examine the voltage-current characteristics. (Sample No. 1)

For comparison, an electrodeposited substrate (electrode) was made following the same procedure as in Example 2 with the exception that multilayered carbon nanotubes (produced by The Honjo Chemical Corp.; hereinafter referred to as "multi-layered CNT") were used instead of the ground carbonaceous particles. (Sample No. 2)

Figure 6:
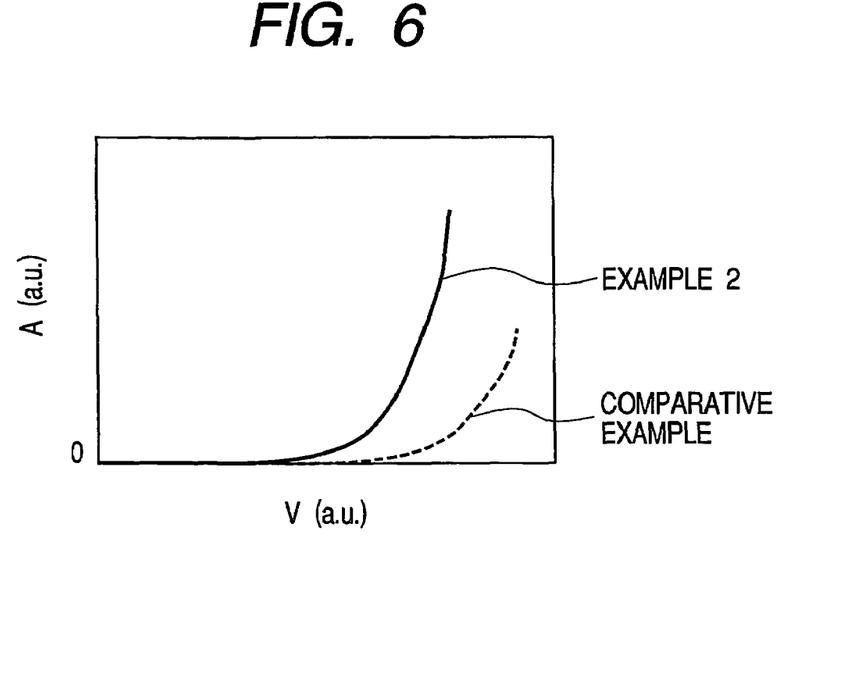
FIG. 6 is a graph showing field electron emission characteristics.

The field electron emission characteristics of Sample No. 1 and 2 were measured. The results are shown in FIG. 6. In FIG. 6, the abscissa indicates the applied voltage and the ordinate indicates the measured current value. In FIG. 6, current curves of Example 2 (Sample No. 1) and Comparative Example (Sample No. 2) are shown together.

It has been seen from the results shown in FIG. 6 that the carbonaceous particle of the present example obtained by pulverizing the carbonaceous particle obtained in Example 1 with the planetary ball mill has clearly superior field electron emission characteristics compared to those of the conventional multilayered CNT. The carbonaceous particle produced by the production method according to the present invention has a distinctive microstructure in the flake, as is clear from the TEM photograph shown in FIG. 3B. It is considered that the microstructure is formed of nanocarbons each comprising a fine aggregate of plural graphene sheets as stacked, and most of the planes of the graphene sheets are arranged perpendicularly to the plane of the hexagonal flake. Therefore, it is presumed that many of graphene sheet edges, which function as sites for electron emission, exist on the surface (hexagonal plane) of the hexagonal, flaky carbonaceous particle, consequently improving the field electron emission characteristics. The improved field electron emission characteristics are considered to be also attributable to that when the hexagonal, flaky carbonaceous particles are formed on an electrode, the particles tend to be arranged parallel to the electrode plane because of the flatness (flakiness) thereof, whereby the electrode layer formed of the hexagonal, flaky carbonaceous particles has a high electrical conductivity. It is considered that for these reasons, the sample of the present example exhibits the electron emission function at a lower voltage than that of the comparative sample.

Example 3

The carbonaceous particles obtained in Example 1 were calcined in an inert gas at 2,500° C. to remove metallic component therefrom. The thus calcined carbonaceous particles were mixed with a binder and an alcohol to make a paste, and the paste was applied to a current collector made of a copper foil to prepare a negative electrode. Separately, a positive electrode was prepared by using lithium cobalt oxide. By using the negative electrode and the positive electrode, a lithium secondary battery having the configuration shown in FIG. 7 was made according to the above-described lithium secondary battery production method. As a result of evaluating the charge/discharge efficiency of the thus obtained lithium secondary battery thorough a charge/discharge cycle test, the charge/discharge efficiency at the 50th cycle was as good as 1.12, when that of a lithium second battery using graphite for a negative electrode was defined as 1.0.

Generally, at the time of electrode formation, when an electrode material is press-worked in order to increase the electrode density, a normal flaky material tends to orient in the plane direction. In this case, the electrode will be internally damaged due to distortion in the c-axis direction caused by repeated insertion/release of lithium ions into/from carbon, thereby lowering the cycle characteristics. However, it is considered that the negative electrode for the lithium secondary battery using the calcined carbonaceous particles obtained in the present example has a little difference in electrical resistivity between the a-axis or b-axis direction and the c-axis direction even after the orientation in the plane direction by a press working, thereby preventing the occurrence of the distortion in the c-axis direction due to the repeated insertion/release of lithium ions into/from carbon, resulting in less degradation of the charge/discharge cycle characteristic.

Example 4

In this example, 5.0 g of toluene as a starting material, 0.25 g of ferrocene as an iron compound for a primary catalyst, 0.25 g of dodecanthiol as a cocatalyst and 40 g of carbon dioxide as a medium were introduced into a reaction vessel 102 of the production apparatus shown in FIG. 1, and were reacted at a temperature of 430° C. and a pressure of 25 MPa for three hours. As a result of analyzing the obtained reaction product (carbonaceous particles), the particle had the same shape as that of Example 1. The carbonaceous particles were calcined in the same manner as in Example 3, and a lithium secondary battery was made using the thus calcined carbonaceous particles in the same manner as in Example 3.

The charge/discharge efficiency of the thus obtained lithium secondary battery was evaluated through a charge/discharge cycle test. As a result, the quantity of occluded lithium at 50th charge/discharge of the lithium secondary battery was as good as 1.19, when that of a lithium second battery using graphite for a negative electrode was defined as 1.0.

Example 5

In this example, 3.9 g of methane as a starting material, 0.20 g of ferrocene as an iron compound for a primary catalyst, 1.5 g of copper oxide as an oxygen-containing compound, and 40 g of carbon dioxide as a medium were introduced into a reaction vessel 102 of the production apparatus shown in FIG. 1, and were reacted at a temperature of 800° C. and a pressure of 12.5 MPa for 0.5 hour. As a result of analyzing the obtained reaction product (carbonaceous particles), the particle had the same shape as that of Example 1. The carbonaceous particles were calcined in the same manner as in Example 3, and a lithium secondary battery was made using the thus calcined carbonaceous particles in the same manner as in Example 3.

The charge/discharge efficiency of the thus obtained lithium secondary battery was evaluated through a charge/discharge cycle test. As a result, the quantity of occluded lithium at 50th charge/discharge of the lithium secondary battery was as good as 1.17, when that of a lithium second battery using graphite for a negative electrode was defined as 1.0.

As the mechanism of the formation of the carbonaceous particles in the present example, it is hypothesized that the copper oxide reduced the ferrocene to form hexagonal iron oxide particles, which then reacted with methane in a supercritical state, whereby carbon atoms formed hexagonal carbon particles.

As described above, according to the present invention, carbonaceous particles having a distinctive appearance/shape and internal structure can be mass-produced at a low cost from inexpensive raw materials, and the carbonaceous particles have an excellent field electron emission performance and a high electron conductivity, shows excellent characteristics particularly when used in the secondary battery, and can be applied to various devices other than the secondary battery as well.

The invention claimed is:

1. A carbonaceous particle comprising a hexagonal flake formed of an aggregate of a plurality of nanocarbons and having a side length of 0.1 to 100 μm and a thickness of 10 nm to 1 μm.

2. The carbonaceous particle according to claim 1, wherein the hexagonal flake has a layered structure.

3. The carbonaceous particle according to claim 2, wherein the hexagonal flake comprises a stack of a plurality of hexagonal sheets.

4. The carbonaceous particle according to claim 1, wherein the ratio of the thickness to the side length of the hexagonal flake is 1/10 to 1/100.

5. The carbonaceous particle according to claim 1, wherein the hexagonal flake comprises a microstructure comprising an aggregate of stacks of graphene sheets.

6. The carbonaceous particle according to claim 5, wherein the graphene sheets are arranged such that the plane of the graphene sheet is substantially perpendicular to the plane of the hexagonal flake.

7. The carbonaceous particle according to any one of claims 1 to 6, wherein the hexagonal flake comprises an aggregate of microcrystals simultaneously having crystal lattice planes with a crystal lattice spacing of 0.329 to 0.346 nm, 0.209 to 0.219 nm and 0.199 to 0.209 nm, respectively.

8. The carbonaceous particle according to any one of claims 1 to 6, which contains iron element and at least one of sulfur element and oxygen element.

9. A method of producing the hexagonal, flaky carbonaceous particle set forth in claim 1, comprising the step of reacting (a) a carbon-containing compound, and at least (b) iron or an iron compound, and (c) at least one of an oxygen-containing compound and a sulfur-containing compound, at a pressure within the range of 2.5 to 60 MPa and at a temperature within the range of 80 to 800° C.

10. A method of producing the hexagonal, flaky carbonaceous particle set forth in claim 1, comprising the step of reacting (a) a carbon-containing compound, and at least (b/c) iron and a sulfur-containing compound, or an iron compound and a sulfur-containing compound, and (d) a medium, at a pressure within the range of 2.5 to 60 MPa and at a temperature within the range of 80 to 800° C.

11. A method of producing the hexagonal, flaky carbonaceous particle set forth in claim 1, comprising the step of reacting (a) a carbon-containing compound, and at least (b/c) iron and an oxygen-containing compound, or an iron compound and an oxygen-containing compound, at a pressure within the range of 2.5 to 60 MPa and at a temperature within the range of 80 to 800° C.

12. The method of producing the hexagonal, flaky carbonaceous particle according to claim 9 or 11, wherein the temperature and pressure during the reaction are such that the carbon-containing compound (a) becomes a supercritical fluid or a subcritical fluid.

13. The method of producing the hexagonal, flaky carbonaceous particle according to claim 9 or 11, wherein a product obtained in the step of reacting (a), (b) and (c) is calcined.

14. The method of producing the hexagonal, flaky carbonaceous particle according to claim 13, wherein the calcination is performed at a temperature within the range of 900 to 2,800° C. in an inert gas atmosphere.

15. A method of producing the hexagonal, flaky carbonaceous particle set forth in claim 1, comprising the step of reacting (a) an aromatic hydrocarbon, at least (b/c) iron and a thiol compound or an iron compound and a thiol compound, and (d) at least one medium selected from the group consisting of carbon dioxide, an alcohol, an ether, a hydrocarbon, water, and an inert gas, at a pressure within the range of 2.5 to 60 MPa and at a temperature within the range of 80 to 800° C.

16. A method of producing the hexagonal, flaky carbonaceous particle according to claim 10 or 15, wherein the temperature and pressure during the reaction are such that at least one of the carbon-containing compound (a) and the medium (d) becomes a supercritical fluid or a subcritical fluid.

17. The method of producing the hexagonal, flaky carbonaceous particle according to claim 10 or 15, wherein a product obtained in the step of reacting (a), (b), (c), and (d) is calcined.

18. The method of producing the hexagonal, flaky carbonaceous particle according to claim 17, wherein the calcination is performed at a temperature within the range of 900 to 2,800° C. in an inert gas atmosphere.

19. The method of producing the hexagonal, flaky carbonaceous particle set forth in any one of claims 9 to 15, wherein the produced carbonaceous particle contains iron element and at least one of sulfur element and oxygen element.

* * * * *